(12) United States Patent
Huege et al.

(10) Patent No.: US 7,338,649 B2
(45) Date of Patent: *Mar. 4, 2008

(54) METHOD OF PRODUCING FOOD GRADE HYDRATED LIME

(75) Inventors: Fred R. Huege, Colleyville, TX (US); Luis Diaz Chavez, Beauvechain (BE); Roger Fawcett, Fort Worth, TX (US); Herbert S. Curtis, Phoenix, AZ (US)

(73) Assignee: Chemical Lime Company, Fort Worth, TX (US)

( * ) Notice: Subject to any disclaimer, the term of this patent is extended or adjusted under 35 U.S.C. 154(b) by 182 days.

This patent is subject to a terminal disclaimer.

(21) Appl. No.: 11/181,424

(22) Filed: Jul. 14, 2005

(65) Prior Publication Data

US 2005/0287055 A1 Dec. 29, 2005

Related U.S. Application Data

(63) Continuation-in-part of application No. 10/402,888, filed on Mar. 28, 2003, now Pat. No. 6,926,879.

(51) Int. Cl.
*C01F 11/00* (2006.01)

(52) U.S. Cl. .................. 423/636; 423/640; 241/24.1

(58) Field of Classification Search ............... 423/158, 423/637, 640, 636; 241/24.1
See application file for complete search history.

(56) References Cited

U.S. PATENT DOCUMENTS

| | | | |
|---|---|---|---|
| 6,593,379 B1 * | 7/2003 | Leiter et al. ............... | 521/26 |
| 6,926,879 B2 * | 8/2005 | Huege et al. ............... | 423/636 |
| 2003/0213937 A1 * | 11/2003 | Yaniv ....................... | 252/500 |
| 2004/0191163 A1 * | 9/2004 | Huege ....................... | 423/640 |

OTHER PUBLICATIONS

Perry et al, Chemical Engineers' Handbook, Fith edition, 1973 (no month), pp. 8-30 to 8-33.*

* cited by examiner

*Primary Examiner*—Ngoc-Yen Nguyen
(74) *Attorney, Agent, or Firm*—Charles D. Gunter, Jr.

(57) ABSTRACT

A method is shown for producing food grade hydrated lime. A source of raw, hydrated lime is first passed through a classification step which divides the raw hydrated lime into a first fine stream and a first coarse stream. The first fine stream is passed through a further separation step and, without being recombined with the first coarse stream is separated out to form a very fine sized product which meets CODEX chemical specifications. The additional separation step may be a wet process and may utilize a hydrocyclone type separator.

6 Claims, 3 Drawing Sheets

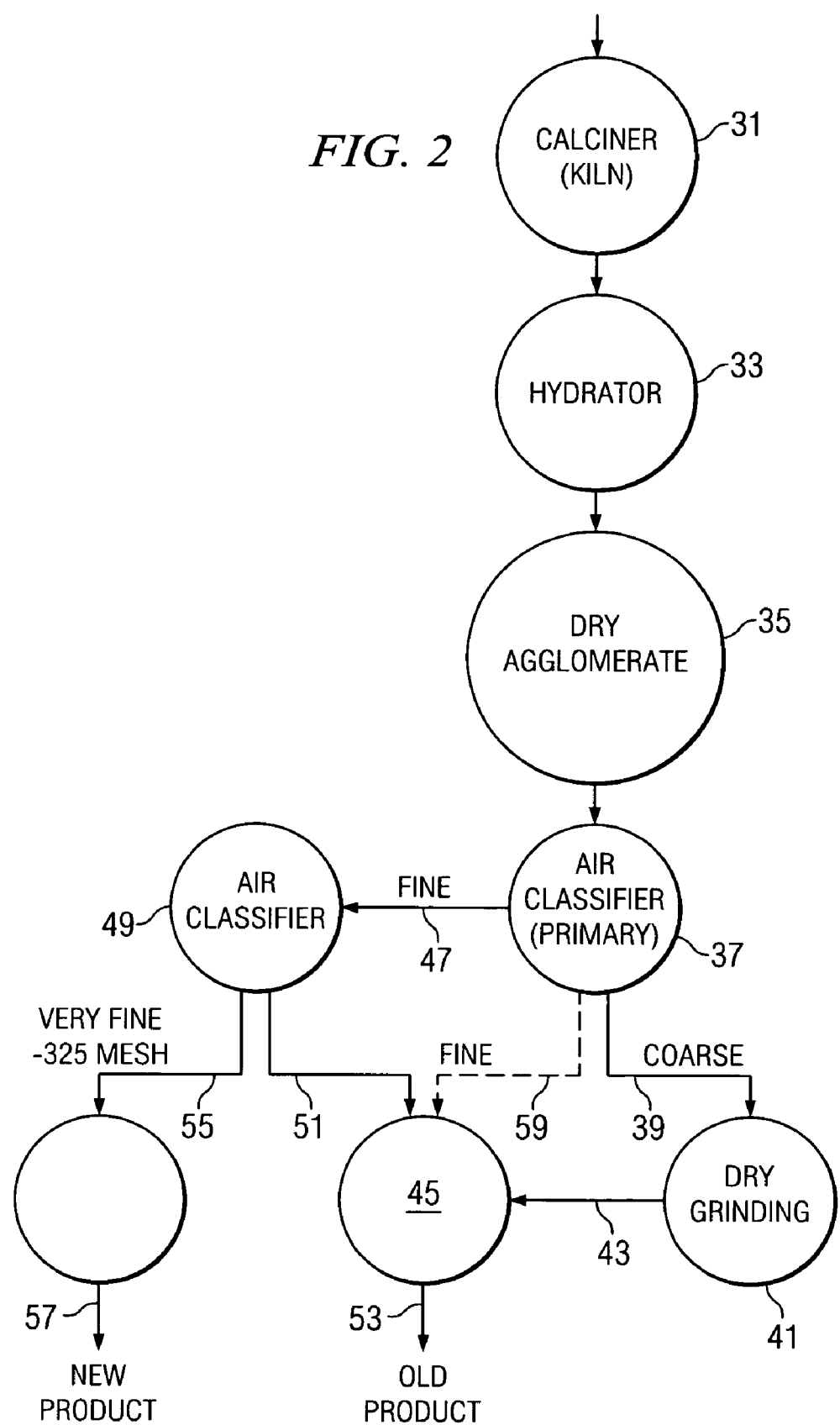

METHOD OF PRODUCING FOOD GRADE HYDRATED LIME

CROSS REFERENCE TO RELATED APPLICATIONS:

The present application is a continuation-in-part of earlier filed Ser. No. 10/402,888, filed Mar. 28, 2003, now U.S. Pat. 6,926,879 entitled "Method of Producing Food Grade Hydrated Lime", by Fred R. Huege and Luis Diaz Chavez.

FIELD OF THE INVENTION

The present invention relates to a method for producing food grade hydrated lime, $Ca(OH)_2$, which meets the standards as required by CODEX without requiring extensive changes in existing equipment or process steps.

DESCRIPTION OF THE PRIOR ART

Lime has a variety of uses. It is commonly used in treating waste water and sewage. It is used in agriculture to neutralize acidic soils and to provide nutrients for sustaining plant life. Lime is also used extensively in construction for the stabilization of soils and as a component in a variety of building materials. Lime is also used in a variety of "food grade" products intended for human consumption.

In this description, the term "lime" will be understood to mean both quicklime (calcium oxide) and hydrated lime (calcium hydroxide). Quicklime is produced by heating limestone (calcium carbonate) in a kiln at extreme temperatures to "calcine" the material and thereby drive off carbon dioxide. Quicklime is usually in the form of lumps or pebbles. In order to further process lime and improve the ease with which it is handled, dry lime is often mixed with water to form a slurry. In the case of quicklime, the water reacts with the quicklime in an exothermic reaction to form hydrated lime. This is often referred to as slaking. During the slaking of quicklime, large amounts of heat are given off which can significantly raise the temperature of the slurry. Water can then be driven off to produce dry, hydrated lime which is usually a powder.

Food grade hydrated lime is a specific material that is sold to the food processing industry in the United States. The specifications for food grade hydrated lime are defined by CODEX. The CODEX Alimentarius Commission was created in 1962 by two U.N. organizations, the Food and Agricultural Organization (FAO) and the World Health Organization (WHO). CODEX is the major international mechanism for encouraging fair international trade in food while promoting the health and economic interests of consumers. Within the United States, CODEX activities are coordinated by officials from the U.S. Department of Agriculture, the U.S. Food and Drug Administration and the U.S. Environmental Protection Agency. In the United States, there are a number of companies that produce "normal", i.e., industrial grade, hydrated lime for industrial use. However, there are only two companies known to Applicant at the present time that produce "food grade" hydrated lime. This is due, at least in part, to the exacting chemical specifications required by CODEX. Many hydrated limes that are suitable for general industrial use, fail to meet the CODEX standards since they exceed, for example, the limits for trace metals found in the compositions.

As mentioned above, hydrated lime is produced by first heating limestone in a kiln (calciner) to remove carbon dioxide and form quicklime. To improve the handling characteristics of the quicklime, a controlled amount of water is then added to form calcium hydroxide, commonly referred to as hydrated lime. To achieve the CODEX chemical specifications requires the use of the purest limestone as calciner feed and normally the use of natural gas as a fuel for the kiln. The use of natural gas, even though it is more expensive, is preferred over solid fuel such as coal or coke, in that solid fuel tends to contaminate the quicklime and thus the hydrated lime made from the quicklime with combustion ash.

A need exists for a method for producing food grade hydrated lime which meets CODEX specifications without drastic changes in the equipment or process parameters presently employed in calcining limestone to produce quicklime, or in slaking the quicklime to produce hydrated lime.

A need exists for a method for producing food grade hydrated lime which would allow the use of normal limestone as feed to the calciner, without requiring the purest of limestone as feed.

A need also exists for such a process which would allow the use of solid fuel sources in the calciner, rather than requiring the use of more expensive natural gas as a fuel source.

SUMMARY OF THE INVENTION

It is an object of the present invention to provide a method for producing food grade hydrated lime without requiring unusually pure limestone as calciner feed.

It is also an object of the invention to provide a method for producing food grade hydrated lime which allows the use of typical solid fuels to fuel the calciner, rather than requiring the use of more expensive natural gas as a calciner fuel.

It is also an object of the present invention to provide a process for manufacturing food grade hydrated lime which separates but retains the larger coarse particles of hydrated lime, as well as the finer, screened particles, so that the larger sized particles can be processed as normal hydrated lime with no waste being introduced into the process.

The present invention concerns an alternative method of producing food grade hydrated lime without the stringent control of limestone feed and calciner fuel. It has been discovered that some "normal" limestone calciner feed has its impurities distributed over different particle sizes. Additionally, the combustion ash deposited on the quicklime (CaO) also varies in particle size. During the hydration reaction that converts calcium oxide to calcium hydroxide, these impurities can be separated and removed from the calcium hydroxide particles. In this way, a food grade hydrated lime can be produced from quicklime (CaO) that previously did not meet the CODEX chemical specifications.

In the method of the invention, a source of raw, hydrated lime is first passed through a classification step which divides the raw hydrated lime into a first fine stream and a first coarse stream. The first coarse stream is then either recycled in the process or passed to a grinder which produces a ground coarse product. The first fine stream is separated out, without combining the first fine stream with the first coarse stream or with the ground coarse product, and is removed to produce a very fine sized product which meets CODEX chemical specifications.

While the method of the invention can be practiced in a one step separation process, the method is preferably practiced in a two step separation process. The source of raw, hydrated lime is first passed through a classification step as before to produce a first coarse stream having particle sizes in the range from about +10 to 50 mesh or larger. The first coarse stream is passed to a grinder which produces a ground coarse product, or can be recycled in the process. A first fine stream which is produced in the primary classification step is subjected to a secondary classification step and very fine product is separated out, without combining the very fine stream with the first coarse stream or with the ground coarse product, to produce a very fine sized product having a particle size of about −325 mesh or finer which meets CODEX chemical specifications. The secondary classification step can be a wet classification step, such as through the use of wet screening or through the use of a hydrocyclone type centrifuge.

Additional objects, features and advantages will be apparent in the written description which follows.

BRIEF DESCRIPTION OF THE DRAWINGS

FIG. 2 is a schematic view, similar to FIG. 1, showing the method steps of a dry classification process which is used to produce food grade hydrated lime of the invention.

DETAILED DESCRIPTION OF THE INVENTION

In the discussion which follows, the term "quicklime" will be taken to mean calcium oxide and should not be confused with limestone (calcium carbonate). As briefly outlined in Applicant's background discussion, quicklime is manufactured from limestone by heating to remove carbon dioxide. Quicklime can be converted to $Ca(OH)_2$ by a slaking process where water and CaO are mixed under agitation and temperature to produce $Ca(OH)_2$, known in the industry as slaked lime or lime hydrate.

Figure 1:
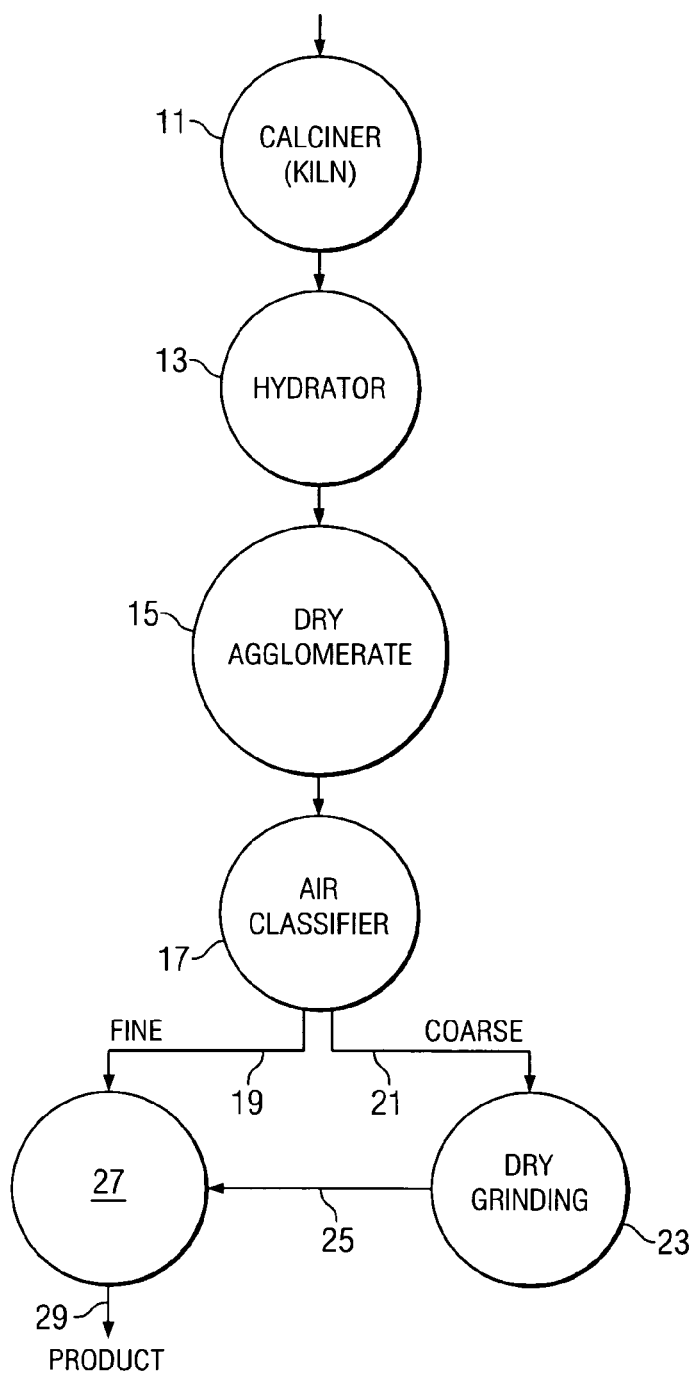
FIG. 1 is a simplified, schematic of a prior art process for producing industrial grade hydrated lime.

FIG. 1 is a simplified, schematic diagram which illustrates the prior art process for producing industrial grade hydrated lime. Raw limestone is first fed to a calciner 11 which is typically a horizontal or vertical kiln. The kiln is fired by burners which typically utilize pulverized coal as a fuel and are capable of reaching calcining temperatures in excess of 1600° F. The intense heat causes a chemical reaction as follows:

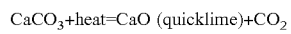
$$CaCO_3 + heat = CaO \text{ (quicklime)} + CO_2$$

The quicklime produced in the calciner 11 is then slaked by mixing with an aqueous slaking medium in hydrator 13. This results in an exothermic reaction generating heat and calcium hydroxide:

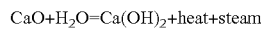
$$CaO + H_2O = Ca(OH)_2 + heat + steam$$

The size and quality of slaked lime particles in the resulting slurry are dependent on a number of variables. These include the reactivity, particle size and gradation of the quicklime used. Other variables include the amount of water used, the quality of the water, and the amount and type of water impurities. Further, the temperature of the water and the amount of agitation can affect slaked lime quality and particle size.

The excess water not converted to calcium hydroxide is heated to steam and the steam is volatized from the solid calcium hydroxide particles. The solid calcium hydroxide leaving the reactor is composed of individual calcium hydroxide particles, agglomerated calcium hydroxide particles, individual impurity particles, and impurities associated with the individual and agglomerated calcium hydroxide particles. These materials are represented as "dry agglomerate" in the step 15 shown in FIG. 1 and comprise a broad distribution of calcium hydroxide particles.

This broad distribution of particles is then normally screened or air classified in a step 17 which divides the raw hydrated lime into a first fine stream 19 and a first coarse stream 21. Because a large percentage of the calcium hydroxide is present in the coarse fraction of stream 21, this fraction is normally ground in a dry grinding step 23 and then returned to the fine calcium hydroxide particles in a stream 25, the particles being mixed in a step labeled as 27 in FIG. 1. During this process all the impurities present in the quicklime, calcium oxide feed are also present in the final calcium hydroxide product which passes out stream 29.

Applicants have discovered that for most quicklime/hydrated lime productions, the impurities that are important for CODEX specifications are uniformly distributed in all particle sizes of the calcium hydroxide which is formed according to the above described prior art process. However, Applicants have also discovered that certain sources of raw feed materials (calcium carbonate) allow the production of food grade hydrated lime which meets the CODEX impurity specifications by incorporating an additional process step which removes the large coarser particles that are formed during the hydration reaction that converts calcium oxide to calcium hydroxide. The additional step removes impurities which can be separated and removed from the resulting calcium hydroxide product. Thus, a food grade hydrated lime can be produced from quicklime that previously did not meet the CODEX chemical specifications.

In a first embodiment of the invention, the specific process is a "dry" process in which the "raw" calcium hydroxide is taken from the reactor and then mechanically screened or air classified to remove the coarse +10 to 100, most preferably +10 to 50, mesh particles. The fine fraction can then be further screened or air classified to −325 mesh to achieve the necessary purity. While the preferred method of the invention is a two step separation process to achieve higher yields of finer product, it is within the scope of the invention to have a single (one size) separation to meet the CODEX specifications. The critical point in the method of the invention is to insure that the coarse fraction of calcium hydroxide is not processed as in the prior art, by grinding and adding it to the fine food grade calcium hydroxide.

In a second embodiment of the invention, the classification step or steps are carried out in a "wet" process to remove the coarse fraction of particles. The wet process can comprise, for example, a wet slurry screening or a wet classification in which a hydrocyclone centrifuge type process is utilized.

The first embodiment of the improved method for producing food grade hydrated lime of the invention is illustrated in FIG. 2 of the drawings. Raw limestone is calcined in a step 31, as before. The resulting quicklime is hydrated in a step 33 with the dry agglomerate of step 35 being fed to an air classifier or screening in a step 37. The separated out coarse particles in stream 39 pass to a dry grinder 41 where they are reduced in size and fed through stream 43 to mixing point 45.

In the preferred method of FIG. 2, the first fine stream of particles 47 are passed to a secondary separation step in air classifier 49. A resulting relatively coarse stream 51 can be returned to the mixing point 45 to be combined with the product in stream 43, thereby producing old product in outlet stream 53. In the improvement of the invention, the very fine particles (−325 mesh) in stream 55 remain separated from the second coarse stream 51 and are removed as product through outlet stream 57 without combining the first coarse stream 39 or with the ground coarse product 43. The product removed through outlet stream 57 is a very fine sized product which meets CODEX chemical specifications.

The invention is thus intended to encompass a two step separation process in which the coarse calcium hydroxide particles from the first separation, which contain a larger portion of the impurities, can be ground and added to the coarse fraction of the second size separation (shown being combined in the mixer 45 in FIG. 2). This product can meet the specification for "normal" hydrated lime with no waste and 100% of the quicklime/hydrated lime being utilized in the process. The dotted line 59 in FIG. 2 is intended to represent the option of passing a portion of the first fine stream to old product, rather than further processing it to produce food grade product, at the option of the operator.

The following Table I shows the results of seven different quicklime/hydrated lime systems and how the impurities are affected by particle size separation. Note that no sample achieved CODEX food grade specifications with the then currently available hydrated lime. Only sample #7 achieved CODEX food grade specification with impurities removed in a coarse fraction.

Figure 4:
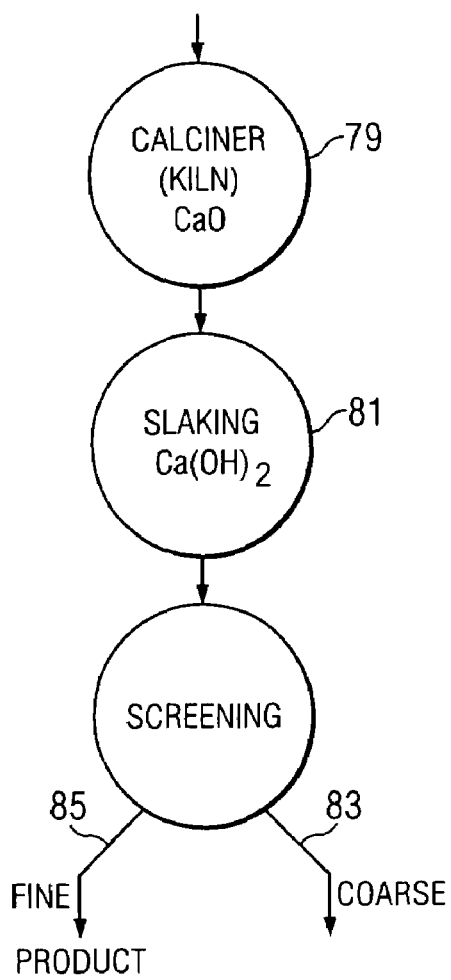
FIG. 4 is a schematic view, similar to FIG. 3 showing another wet screening method of using a slurry to screen and separate out coarse particles.

In FIG. 4, quicklime from the calciner 79 is slaked in a step 81 to produce calcium hydroxide. The slaked calcium hydroxide is then screened, as before, to separate out the +100 to +325 mesh coarse particles in a stream 83 with the fine particles in the slurry passing out the separate stream 85.

Figure 5:
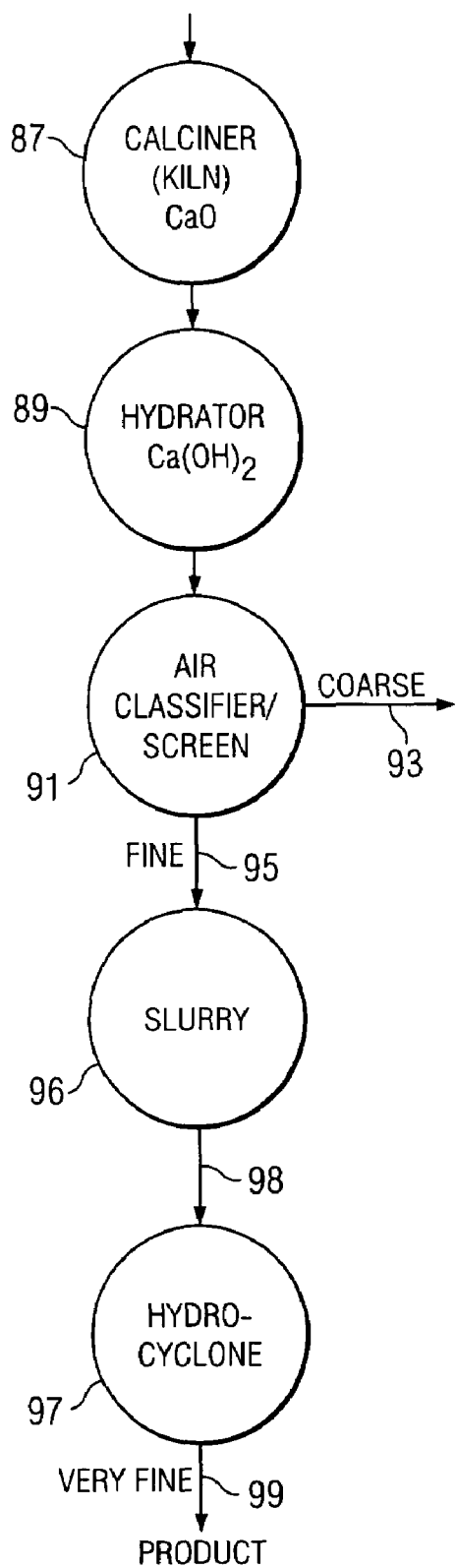
FIG. 5 is a schematic view of another wet separation or classification process which uses a hydrocyclone to separate out coarse particles.

FIG. 5 shows another type of "wet" separation process in which a hydrocyclone (centrifuge) is used to produce a very fine product. As illustrated in FIG. 5, CaO from the calciner 87 is passed to a hydrator 89. The calcium hydroxide passes from the hydrator 89 to the same type traditional dry air classifier system 91 as previously described. This step in the process produces a relatively coarse product stream 93 and a relatively fine product stream 95. The relatively fine product stream 95 is slurried in a suitable vessel 96 and then passes through a line 98 to a hydrocyclone 97, the output of which is a very fine product in stream 99.

The standard definition of a hydrocyclone is a conical liquid separator which separates material in a water slurry according to density. For example, hydrocyclones are used in the mining industries to sort the slurry of ground ore and water according to how finely the rock has been ground. The hydrocyclone separator useful in the method of the present invention can be any of a number of commercially available devices which will be generally familiar to those skilled in the chemical and mining industries. For example, suitable separators are commercially available from Krebs Engineers of Tucson, Ariz. Krebs supplies a broad range of sizes, styles and configurations of hydrocyclones. Hydrocyclones from 0.5- to 90-inch [13- to 2,286-mm] in diameter are offered to meet specific performance objectives in a variety of settings. Specific models include, for example, the commercially available Krebs GMAX® hydrocyclones.

The following table summarizes data obtained through the use of a hydrocyclone separator such as that illustrated as 97

TABLE I

| | FCC specifications | Sample # 1 HL | Sample # 1 −100 mesh | Sample # 2 HL | Sample # 2 −100 mesh | Sample # 3 HL | Sample # 3 −100 mesh | Sample # 4 HL | Sample # 4 −100 mesh | Sample # 5 HL | Sample # 5 −100 mesh | Sample # 6 HL | Sample # 6 −100 mesh | Sample # 7 HL | Sample # 7 −100 mesh |
|---|---|---|---|---|---|---|---|---|---|---|---|---|---|---|---|
| Calcium hyd. | 95.0% min. | 96.5 | 97 | 96.1 | 95.7 | 96.8 | 95.1 | 95.5 | 95.7 | 93.4 | 95.2 | 96.1 | 96.3 | 97.1 | 97.2 |
| Acid insoluble | 0.50% max | 2 | 0.4 | 0.3 | 0.1 | 0.2 | 0.1 | 1.8 | 1.5 | 0.3 | 0.2 | 1.9 | 0.7 | 1.0 | 0.2 |
| Magnesium | 4.8% max | 0.5 | 0.2 | 0.35 | 0.3 | 0.2 | 0.3 | 1.0 | 0.9 | 1.7 | 1.9 | 1.3 | 1.0 | 0.3 | 0.2 |
| Arsenic | 3 ppm max | | 0.9-20.0 | | 0.02 | 0.1 | 4.0 | 3.0 | | | | 1.3 | | | | 0.6 |
| Fluoride max | 50 ppm | | 45 | | 64 | | 65 | 80 | 100 | | 56 | | | | 36 |
| Lead max | 10 ppm | | 0.63 | | 0.8 | | 0.5 | 0.7 | 0.8 | | 0.37 | | | | 0.44 |
| Heavy metals max | 30 ppm | | 60 | | <30 | | <30 | <30 | <30 | | 60 | | | | <30 |

Figure 3:
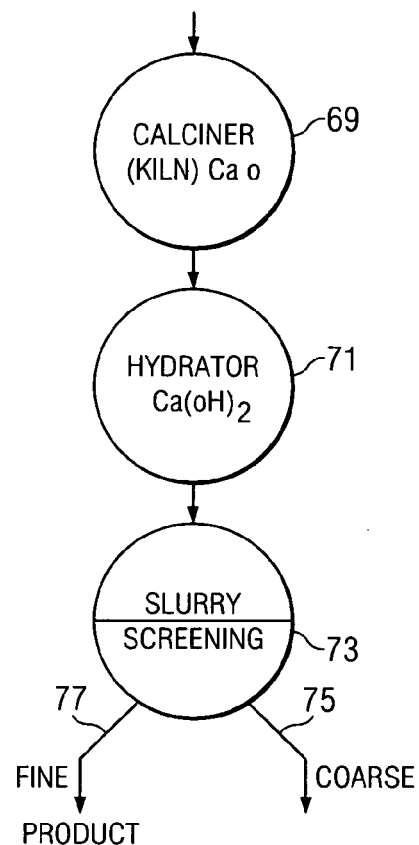
FIG. 3 is a schematic view, similar to FIG. 2 but showing an alternative wet screening method of the invention in which coarse particles are separated out of a slurry.

The invention has been described with respect to an air classifier separation step, followed by dry grinding of coarse product in one preferred embodiment of the invention. Those skilled in the art will also appreciate that the separation of coarse from fine particles could also be accomplished by using a slurry to separate out the coarse particles in a "wet" process. In FIG. 3, quicklime from the calciner 69 passes through a hydration step 71 as in the previously described method. In this case, however, the raw hydrated lime is slurried by the addition of an aqueous medium in a step 73 and the slurry is then screened to separate out the +100 to +325 mesh coarse particles in a stream 75 with the fine particles passing out in a separate stream 77.

in FIG. 5 for the separation of grit, i.e., acid insoluble material from a hydrated lime slurry.

The acid insoluble specification for CODEX food grade is 0.5%.

| Hydrocyclone Separation | % Solids | % Acid Insoluble |
|---|---|---|
| Feed | 45 | 1.26 |
| Underflow (coarse) | 48.5 | 2.70 |
| Overflow (Food Grade) | 42.3 | 0.30 |

With the use of a hydrocyclone the heavier large grit (sand, silica, etc.) is removed in the underflow, while the fine "food Grade" HL is the overflow.

An invention has been provided with several advantages. The method of the invention allows food grade hydrated lime to be produced with little change in existing process equipment or processing steps. The method is simple in design and economical to implement. In addition to producing a new food grade product stream, the process can utilize the separated coarser hydrate particles by combining these particles with an old product stream to produce an industrial grade hydrated lime.

While the invention has been shown in several of its forms, it is not thus limited but is susceptible to various changes and modifications without departing from the spirit thereof.

We claim:

1. A method for producing high purity, food grade hydrated lime, the method comprising the steps of:
    providing a source of raw hydrated lime;
    passing the raw hydrated lime through a first classification step which divides the raw hydrated lime into a first fine stream and a first coarse stream having particle sizes in the range from about +10 to 50 mesh;
    without combining the first fine stream with the first coarse stream, subjecting the first fine stream to a further classification step to produce a very fine product stream and removing the very fine stream to produce a very fine sized product having a particle size of about −325 mesh or below which meets CODEX chemical specifications; and
    wherein the step of subjecting the first fine stream to a further classification step includes the steps of first forming a wet slurry of the first fine stream and then subjecting the wet slurry to a wet separation process.

2. The method of claim 1, wherein the wet process is hydrocyclone separation process.

3. The method of claim 1, wherein the wet process is a slurry screening process.

4. The method of claim 1, wherein the first classification step which divides the raw hydrated lime into a first fine stream and a first coarse stream comprises passing the raw hydrated lime through an air classifier.

5. The method of claim 1, wherein the raw hydrated lime is prepared by slaking quicklime with water.

6. The method of claim 1, wherein the very fine product contains less than 0.5% by weight acid insoluble material, thereby meeting the CODEX specification for food grade hydrated lime.

* * * * *